(12) United States Patent
Durtler

(10) Patent No.: US 6,271,754 B1
(45) Date of Patent: *Aug. 7, 2001

(54) METHOD AND SYSTEM FOR DETECTING INTRUSIONS INTO A PARTICULAR REGION

(75) Inventor: Willem Durtler, Calgary (CA)

(73) Assignee: Microlynx Systems, Ltd., Calgary (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,858

(22) Filed: Jul. 1, 1999

(51) Int. Cl.[7] .................................................. G08B 13/18
(52) U.S. Cl. .................. 340/552; 340/545.3; 340/567
(58) Field of Search .................... 340/552, 565, 340/540, 541, 545.3, 567; 342/27, 28

(56) References Cited

U.S. PATENT DOCUMENTS

| | | |
|---|---|---|
| 401,472 | 4/1889 | Taylor . |
| 3,477,019 | 11/1969 | Hartmann . |
| 3,696,243 | 10/1972 | Risely . |
| 3,740,549 | 6/1973 | Thorne-Booth . |
| 3,967,262 | 6/1976 | Reich et al. . |
| 4,032,916 | 6/1977 | Galvin et al. . |
| 4,091,367 * | 5/1978 | Harman ................................. 340/258 |
| 4,155,083 | 5/1979 | Slaats et al. . |
| 4,327,358 | 4/1982 | Karas . |
| 4,401,980 | 8/1983 | Rittenbach et al. . |
| 4,562,428 * | 12/1985 | Harman et al. ....................... 340/552 |
| 4,571,578 | 2/1986 | Karas . |
| 4,886,226 | 12/1989 | Frielinghaus . |
| 4,987,394 | 1/1991 | Harman et al. . |
| 5,440,291 | 8/1995 | Foster, Jr. et al. . |
| 5,521,600 * | 5/1996 | McEwan ................................. 342/27 |
| 5,529,267 | 6/1996 | Giras et al. . |
| 5,581,256 * | 12/1996 | McEwan ................................. 342/27 |
| 5,680,054 | 10/1997 | Gauthier . |
| 5,743,495 | 4/1998 | Welles, II et al. . |
| 5,769,364 | 6/1998 | Cipollone . |

* cited by examiner

Primary Examiner—Nina Tong
(74) Attorney, Agent, or Firm—Cesari and McKenna, LLP

(57) ABSTRACT

An intrusion detection system for detecting objects entering a particular region is comprised of a transmitter, receiver and cable assembly, wherein the transmitter and receiver are connected at opposite ends of the cable assembly. In a first embodiment, the cable assembly is comprised of a transmit and receive cable pair that are aligned at each end and positioned at a constant distance from each other along the length. The transmitter is connected to the transmit cable at one end of the cable assembly, and the receiver is connected to the receive cable at the opposite end of the assembly, with a uniform electromagnetic field established between the cables. An intrusion perturbs the field, which causes a change in the magnitude and/or phase of the received signal. In a second embodiment, the cable assembly is comprised of a single detection cable with the transmitter and receiver connected to opposite ends. An electromagnetic field of propagation extends beyond the unshielded, or partially shielded detection cable and an intrusion causes a change in the effective dielectric constant of the cable. The change in the dielectric constant causes either a positive or negative phase shift depending on whether the intruding object is entering or departing the electromagnetic field. In either embodiment, the phase, or magnitude or both of the received signal are detected to produce a comparison signal which may be filtered to remove environmental effects. A response signal monotonically related to the magnitude of the changes may be produced and then compared to one or more thresholds. An alarm is indicated when the response signal exceeds a threshold.

27 Claims, 5 Drawing Sheets

METHOD AND SYSTEM FOR DETECTING INTRUSIONS INTO A PARTICULAR REGION

FIELD OF THE INVENTION

This invention relates generally to electrical intrusion detection devices, and in particular to railway signal and hazard detection systems.

BACKGROUND OF THE INVENTION

Railway hazard detection systems have been employed for many years, to detect track discontinuities, such as breaks or severe misalignments. Prior systems commonly loop an electrical circuit through a portion of track and detect a discontinuity in the track by a corresponding break in the circuit. However, these detection systems are usually inadequate to detect certain hazards occurring on a railway, such as landslides and falling boulders that impinge on but do not break or misalign the tracks. Accordingly, additional systems are usually employed to detect these hazards at locations at which they are likely to occur.

One manner of landslide detection involves stringing a number of current-carrying wires up-hill from the railway. When a falling rock, or similar object, breaks a wire, the flow of current through the wire stops and an alarm circuit is tripped. This type of detection system has several drawbacks. First, it may be expensive and time consuming to install the various wires, especially in locations with rugged terrain. Second, depending upon the relative spacing of the wires, some objects may be able to pass through, over, or under the wires and thereby evade detection. Third, after a break occurs, extensive repairs may be necessary to restore the integrity of the wire network.

Another prior landslide detection system relies on changes to an electromagnetic field established between two graded, "leaky" cables to detect an intrusion. As shown in FIG. 1, two coaxial cables, namely, a transmit cable 2 and a receive cable 4, are deployed at a constant distance from each other along an area of interest. The cables are specially manufactured so that their shields have a plurality of slots 8 along their lengths, to allow a small amount of signal energy to couple from the transmit cable 2 to the receive cable 4. To compensate for signals loses along the cables, the separations between the slots are decreased and sizes of the slot openings are increased with distance from the transmitter and receiver. For intrusion detection, the electromagnetic field associated with the cables must be essentially uniform along the cable length. Accordingly, the relative sizes and positions of the slots are critical. Further, terminators 6 having an impedance that is matched to the characteristic impedance of the cables are attached to the far end of each cable, to minimize signal reflections and standing waves that may produce false readings.

Under steady state, i.e., non-intrusive, conditions, the electromagnetic field 7 is static and the received signal has a constant magnitude and phase. When an object comes near either cable, or between the cables, the electromagnetic field is perturbed, causing a change in the magnitude and/or phase of the received signal.

Unfortunately, the use of graded, leaky coaxial cable in such systems has some significant drawbacks. First, because the size and spacing of the slots can only be adjusted by a finite amount before affecting the characteristic impedance of the cables, there is a fundamental limitation on run length. Second, the cables must be special-ordered and are expensive to manufacture. Third, great care must be taken during installation to properly orient the cables, so that an essentially constant field may be achieved. Lastly, repairs to damaged cable present special problems. While short sections of graded cable may be repaired using a standard patch kit, the replacement of a longer section is difficult because the new cable section must have slots that are properly spaced and sized, to avoid a significant impact on performance. Accordingly, a relatively large inventory of graded cable sections must be maintained.

SUMMARY OF THE INVENTION

An intrusion detection system includes a transmitter and a receiver that are connected to opposite ends of a cable assembly. In a first embodiment, the cable assembly is comprised of a pair of transmit and receive cables that are separated at a constant distance from each other and couple along their lengths. The transmitter is connected to the transmit cable at one end of the assembly and transmits a continuous wave radio frequency signal ("CW RF") into the cable. The signal is emitted from the transmit cable with increasing attenuation along the cable length as the distance from the transmitter increases. The receiver is connected to the receive cable at the opposite end of the assembly, and the attenuated transmitted signal is detected with increasing sensitivity along the receive cable length as distance from the receiver decreases. The increase in the detection sensitivity along the length of the receive cable compensates for the increase in the attenuation of the transmitted signal, and an electromagnetic field produced between the cables is of essentially constant strength along the length of the assembly. An object intruding between, or proximate to, the coupled cables perturbs the electromagnetic field and causes a shift in the magnitude and/or phase of the received signal. When the receiver detects a relatively large, abrupt shift in the phase or magnitude of the received signal, the receiver sets off an alarm to indicate an intrusion.

In a second embodiment, the cable assembly is comprised of a single detection cable with the transmitter and receiver connected to opposite ends. The transmitter transmits a CW RF signal into the transmit end of the detection cable, which produces an electromagnetic field around the cable. An object intruding into the electromagnetic field causes a change in the effective dielectric constant of the cable which, in turn, causes a shift in the phase of the signal received by the receiver. This shift may be positive or negative, depending on whether the object has entered or departed the field. Therefore, this cable configuration can differentiate between landslides and washouts, for example.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
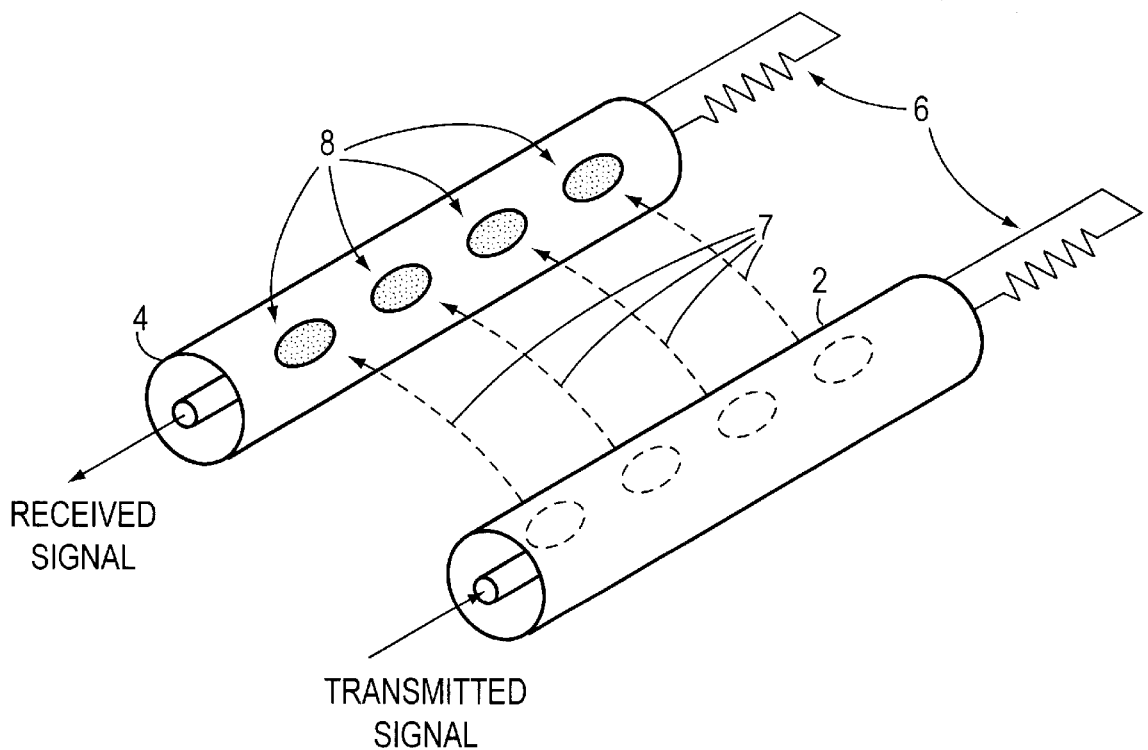
FIG. 1, described above, is an illustration of a cable assembly for a prior art intrusion, detection system that utilizes graded coaxial cable.
Figure 2:
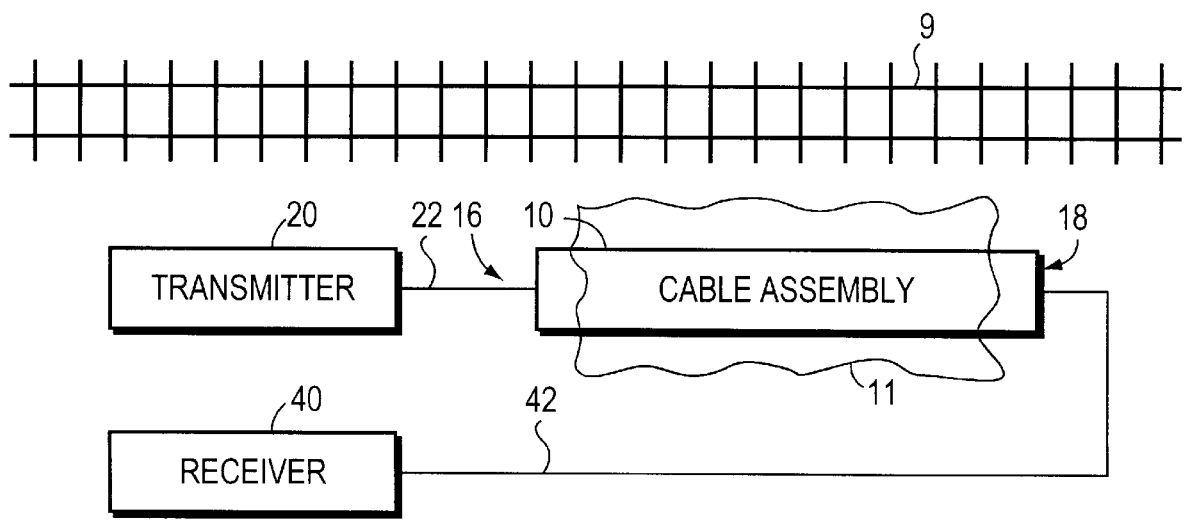
FIG. 2 is a high-level illustration of the inventive intrusion detection system.

A high-level diagram of the inventive intrusion detection system is shown in FIG. 2. A cable assembly 10 is placed within an area 11 to be monitored for intrusions, such as the area beside a railway 9. A transmitter 20 is connected to a first end 16 of the cable assembly 10 through a lead-in cable 22, typically a shielded, unbalanced cable. A receiver 40 is connected to a second end 18 of the cable assembly 10 through a lead-in cable 42, that is similarly a shielded, unbalanced cable.

Figure 3:
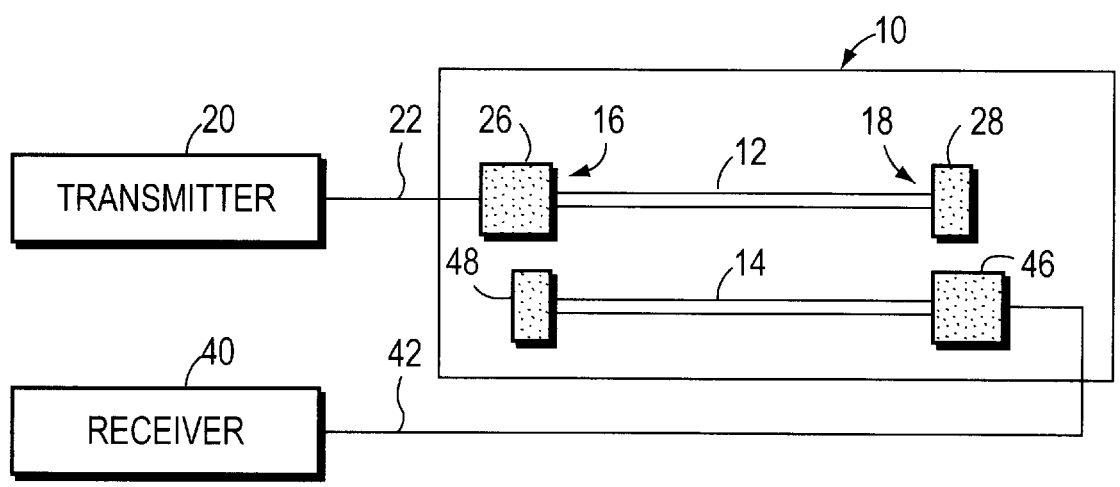
FIG. 3 is a block diagram of a first embodiment of the inventive intrusion detection system.

In a first embodiment, shown in FIG. 3, the cable assembly 10 is comprised of a transmit/receive pair of unshielded, balanced cables 12, 14. The cables are aligned at each end and separated from each other at a constant distance along their lengths. Examples of unshielded, balanced cable include 14-gauge solid twisted pair, 18-gauge stranded twisted pair, and 300 ohm television cable. The transmitter 20 produces an unbalanced, i.e., single-ended, continuous wave (CW) radio frequency (RF) signal that is fed to the transmit cable 12 via the lead-in cable 22 and a BALUN transformer 26. The BALUN 26 transforms the unbalanced CW RF signal to a balanced signal that is carried by the transmit cable 12. The opposite end of the transmit cable 12 is terminated in the characteristic impedance of the cable by a terminator 28. It is preferable that the transmitter lead-in cable 22 be as short as possible, to maximize the signal power in the transmit cable 12 and thereby reduce the adverse effects of any external interference.

The signal emitted from the transmit cable 12 is detected by the balanced receive cable 14. The detected signal is fed to the receiver 40 through a BALUN 46, which transforms the balanced signal to an unbalanced signal. A lead-in cable 42 connects the receiver 40 to the BALUN 46. The opposite end of the receive cable 14 is terminated in the characteristic impedance of the cable by a terminator 48. If necessary, a low-noise amplifier may be inserted between the receiver BALUN 46 and the receiver lead-in cable 42, to provide an adequate signal level for the receiver 40.

Figure 4:
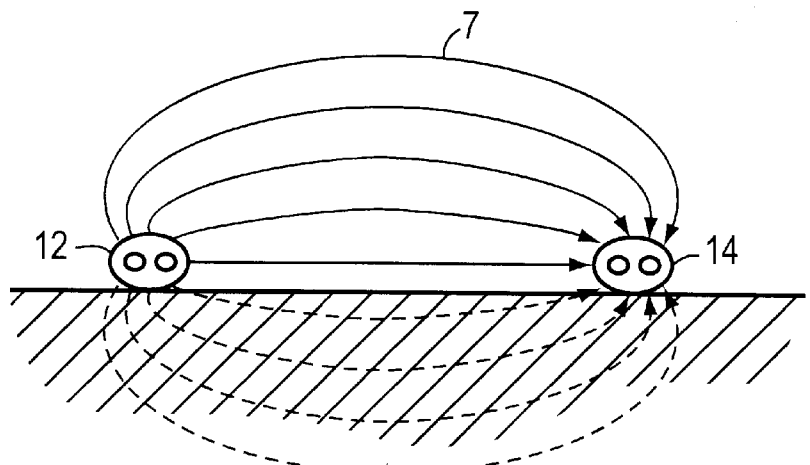
FIG. 4 is an illustration of the electromagnetic field that is established between the transmit/receive cable pair of the first embodiment.

The transmission and reception of the CW RF signal produces an electromagnetic field 7 between the transmission cable 12 and the reception cable 14, as shown in FIG. 4. For optimum performance, the cables should be separated at a distance that is an odd multiple of the observed CW RF signal wavelength, which differs from the free-space wavelength due to the effects of the earth or other material directly supporting the cables. The separation between the cables can be as great as one meter before a significant decease in performance is observed.

The electromagnetic field extends somewhat beyond each cable, and an object moving proximate to and/or between the cables disturbs the field, which produces a change in the phase and/or magnitude of the signal on the transmit cable. The magnitude of the change is determined by both the size and the electromagnetic characteristics of the intruding object, particularly the associated loss and dielectric constant. For example, bodies containing significant amounts of water, such as large "clumps" of ice, produce a greater change in the signal phase than do dry rocks of similar size.

Figure 5:
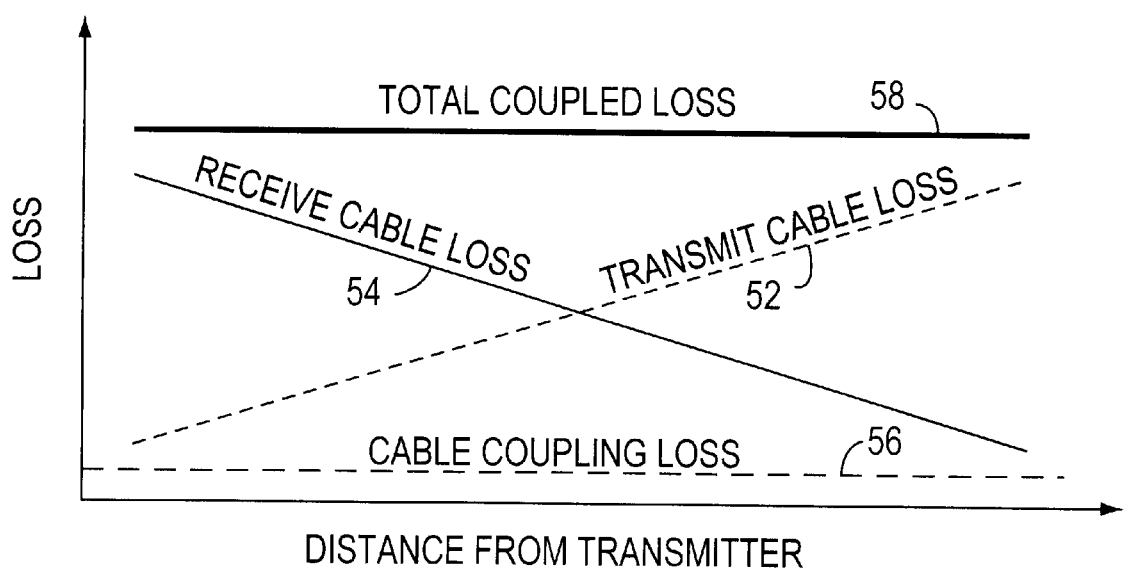
FIG. 5 is a graph of the coupling loss along the length of the cable assembly.

Referring now to FIG. 5, the total signal loss 58 at the receiver is based on the signal loss 52 over the transmit cable and the signal loss 54 over receive cable, and a coupling loss 56 between the cables. The coupling loss, which is based on the characteristics of the cables and the inter-cable separation, is constant. The loss over the transmit cable is directly proportional to the distance that the signals travel over the cable from the transmitter. The loss over the receive cable is directly proportional to the distance the signals, which couple at various points from the transmit cable, travel over the receive cable to the receiver. The signals that couple to the receive cable at, for example, the far end of the transmit cable travel only a short distance over the receive cable, and thus, experience less overall receive cable loss than signals that couple to the receive cable at a point closer to the transmitter. The signals that couple to the receive cable at the far end of the transmit cable are, however, subject to greater attenuation on the transmit cable than the signals that couple to the receive cable at a point that is closer to the transmitter. Accordingly, in the absence of an intrusion, the signals at the receiver, which are the vector sum of the signals traveling over the receive cable, have uniform net signal loss over the length cable assembly, and thus, a uniform coupling and an essentially uniform electromagnetic field over the length of the assembly.

It will be understood by those skilled in the art that a deviation from the parallel layout of coupled cable pair 12, 14 illustrated in FIG. 3 may be implemented without substantially impacting system performance, provided that the constant separation distance is maintained between the cable along the run length. For example, the coupled cable pair may conform to curves in the railway.

It will also be understood by those skilled in the art that the unshielded, balanced cable pair of the first embodiment may be replaced by leaky, unbalanced coaxial cable. Unlike prior art systems, however, the leaky coaxial cable pair of the present invention does not require graded slots to maintain a uniform coupling along the assembly length. In addition, because the CW RF signal continues to be unbalanced in the transmit and receive cables, the BALUNs 26 and 46 are eliminated when a leaky coaxial cable, or other unbalanced cable, is used. Further, the assembly may include one slotted, coaxial cable and one balanced cable, with the inclusion of the BALUNs.

Figure 6:
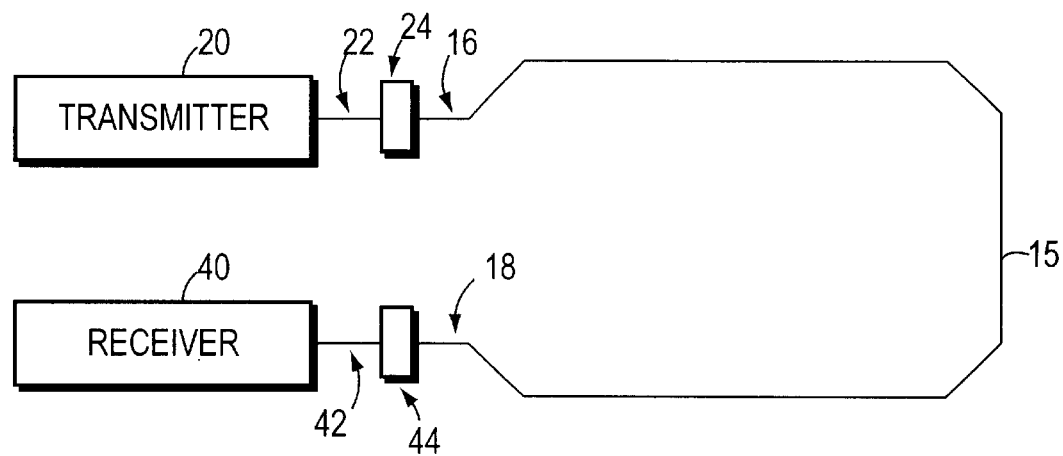
FIG. 6 is a block diagram of a second embodiment of the inventive intrusion detection system.

In a second embodiment, shown in FIG. 6, the unshielded, balanced cable pair of the cable assembly 10 of the first embodiment is replaced by a single unshielded, balanced detection cable 15. The CW RF signal is fed from the transmitter 20 to the detection cable 15 via the lead-in cable 22 and the BALUN 26. The detected signal is fed to the receiver 40 through the BALUN 46 and the lead-in cable 42.

Figure 7:
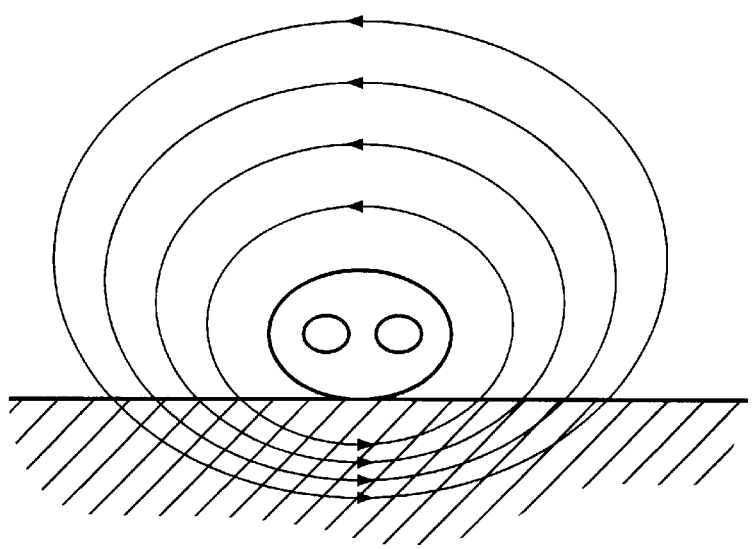
FIG. 7 is an illustration of the electromagnetic field that is established around the detection cable of the second embodiment.

Unlike the first embodiment, which relies on a change in the electromagnetic coupling between the transmit and detection cables to detect an intrusion, the second embodiment relies on a change in the effective dielectric constant of the detection cable 15. It is known in the art that the velocity of propagation, v, in a cable is $$v = \frac{c}{\sqrt{\varepsilon_{\mathit{eff}}}},$$

where c is the speed of light and $\varepsilon_{\mathit{eff}}$ is the effective dielectric constant as seen by the electromagnetic field of propagation. If the electromagnetic field is contained within a shielded cable, the effective dielectric constant is primarily determined by the cable construction. In the case of an unshielded cable, however, the electromagnetic field of propagation extends beyond the cable for several centimeters as it decays exponentially with distance. Thus, the effective dielectric constant is determined by both the cable construction and the material proximate to the cable. For example, referring to FIG. 7, half of the effective dielectric constant of the cable 15 will be determined in large measure by the dielectric constant of the ground (approximately equal to 2.5 times the dielectric constant of free space), while the remaining half will be determined by the dielectric constant of air (approximately equal to that of free space).

When an object intrudes into the electromagnetic field and displaces the air, the effective dielectric constant of the cable is increased and thus the velocity of propagation is decreased. As was the case with the first embodiment, the magnitude of the increase is determined by both the size and composition of the intruding object. The resulting decrease in signal propagation time is detected by the receiver as a negative phase shift in the received signal. Conversely, when an object leaves the field, the dielectric constant of the cable is decreased and the velocity of propagation is increased. This resulting change in signal propagation time is detected as a positive phase shift. Accordingly, the cable configuration of the second embodiment allows the inventive intrusion detection system to also detect the direction of movement either into or away from the detection zone.

While the location of the detection cable 15 is not critical, it is important that the cable be fixed relative to the environment, since a movement of the cable could cause a change in the effective dielectric constant, and thus, a change in the signal propagation time. This requirement is not as critical if the cable is suspended in the air, which has a relatively uniform dielectric constant. A non-graded, leaky coaxial cable may be used in place of the unshielded, balanced cable. However, the coaxial cable provides less sensitivity because a portion of the electromagnetic field is contained by the leaky shield, and an intrusion thus produces less of a change to the effective dielectric constant of the cable.

Figure 8:
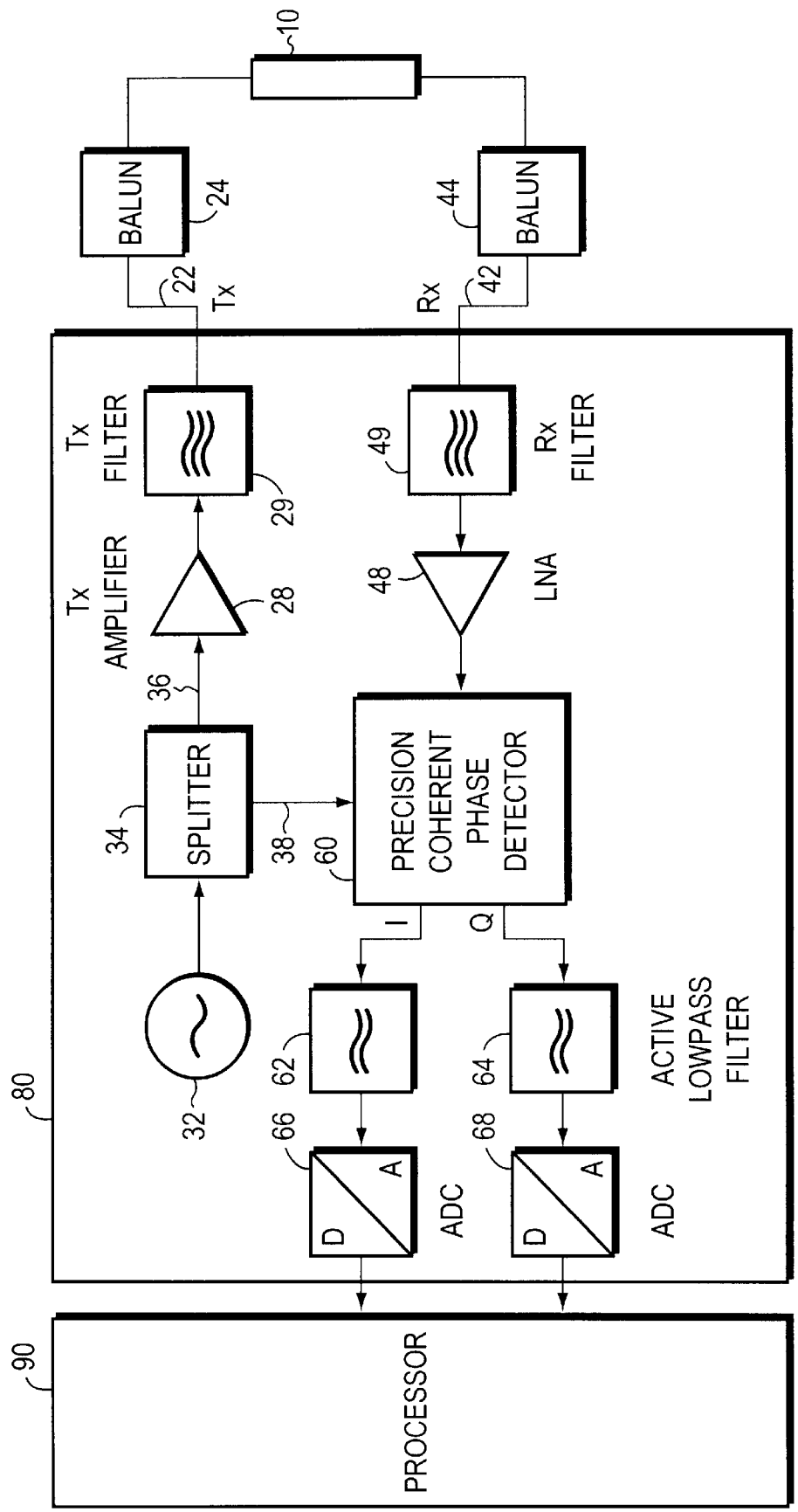
FIG. 8 is a block diagram of the transmitter and receiver hardware.

FIG. 8 is a block diagram of the detection hardware 80 which incorporates both the transmitter and receiver. The detection hardware may be used in conjunction with either embodiment of the cable assembly 10. An oscillator 32 generates a CW RF signal which is split into a transmit portion 36 and a reference portion 38 by a splitter 34. The transmit portion is amplified to the required level by a transmit amplifier 28 and filtered by a narrow-band transmit filter 29 to remove harmonics and other noise. The output of the transmit filter 29 is then fed into the cable assembly 10 as described above.

The signal received from the cable assembly 10 is initially filtered by a narrow-band receive filter 49 to remove noise and other interference, such as that induced by external sources of electromagnetic interference. The filtered signal is amplified by a low noise amplifier (LNA) 48 to raise the received signal to a level adequate for detection. A precision coherent phase detector 60, which in this case is implemented as a quadrature demodulator, produces in-phase (I) and quadrature (Q) signal components which comprise a comparison signal. The I and Q signal components are amplified and filtered by a pair of active lowpass filters, 62 and 64, respectively. The lowpass filter outputs are sampled by a pair of analog-to-digital converters, 66 and 68, respectively. The comparison signal in the form of I and Q data samples is then provided to a signal processor 90.

As a first signal processing step, the signal processor 90 may optionally perform averaging on the comparison signal to reduce the noise component. The processor then performs high-pass filtering to remove slowly-varying changes in the comparison signal due to background variations, such as temperature and precipitation. The signal processor 90 next calculates a response signal that is monotonically related to the magnitude of an intrusion. It compares the magnitude of the response signal to one or more thresholds and generates an alarm signal when the response signal exceeds a threshold.

Although it is preferable that the transmitter 20 and receiver 40 be incorporated into a single unit as shown in FIG. 8 so that, inter alia, they may share the same radio frequency reference generator, it will be understood by those skilled in the art that they may be separated and located at opposite ends of the cable assembly 10 while still maintaining the advantages of the present invention. If the transmitter and receiver are situated at opposite ends of the cable assembly, the receiver must separately determine the reference signal for coherent phase detection. The receiver may receive a reference signal that is transmitted by the transmitter over a non-varying path, such as a shielded coaxial cable or a radio link. Alternatively, the receiver may derive the reference signal directly from the receive signal using a phase locked loop, such that the receiver detects rapid changes in phase and ignores slow changes. The transmitter and receiver may also derive the transmit and the reference signal from a known reference source, such as a GPS signal.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for detecting the intrusion of objects into a region comprising the steps of:

A. generating a continuous wave (CW) radio frequency (RF) signal,

B. transmitting the CW RF signal into a first end of a cable assembly that includes one or more non-graded cables, C. receiving the transmitted CW RF signal at a second end of the cable assembly, D. detecting the phase or magnitude or both of the received CW RF signal, F. comparing the phase or magnitude or both of the received CW RF signal to a CW RF reference to produce a comparison signal, and G. generating an alarm when the phase or magnitude or both of the received CW RF signal differs from the phase or magnitude or both of the reference signal by more than a predetermined amount;

wherein said method further comprises:

a. filtering the comparison signal to remove slowly varying changes occurring in the comparison signal due to background environmental effects, b. calculating a response signal monotonically related to the magnitude of the comparison signal, and c. in the step of generating an alarm, generating the alarm when the response signal exceeds a predetermined threshold.

2. The method of claim 1, wherein the cable assembly includes a transmit cable and a receive cable of approximately equal length that are disposed at an approximately constant distance from each other, said transmit cable having a first end, a second end and a characteristic impedance, said receive cable having a first end, a second end and a characteristic impedance, said first end of the transmit cable aligned with said first end of the receive cable to correspond to said first end of the cable assembly, said second end of the transmit cable aligned with said second end of the reception cable, and further wherein:

in the transmitting step, said transmitter transmits the CW RF signal into the first end of the transmit cable, and in the receiving step, said receiver receives the transmitted CW RF signal at the second end of the receive cable.

3. The method of claim 2 wherein i. the transmitting step further includes terminating the transmit cable with an impedance equal to the characteristic impedance of the transmit cable; and ii. the receiving step further includes terminating with an impedance equal to the receive cable characteristic impedance.

4. The method of claim 2, wherein the transmit and receive cables are unshielded balanced cables.

5. The method of claim 2, wherein the transmit and receive cables are slotted coaxial cables.

6. The method of claim 2, wherein one of the transmit cable or the receive cable is a slotted coaxial cable and the other cable is a balanced, unshielded cable.

7. The method of claim 1, wherein the cable assembly is comprised of a single detection cable having a first end corresponding to said first end of the cable assembly and a second end corresponding to said second end of the cable assembly, and further wherein:

in the transmitting step, said transmitter transmits the CW RF signal into the first end of the detection cable; and in the receiving step, said receiver receives the transmitted CW RF signal at the second end of the detection cable.

8. The method of claim 7, wherein the detection cable is a balanced cable.

9. The method of claim 7, wherein the detection cable is a slotted coaxial cable.

10. An intrusion detection system comprised of:

A. a local oscillator for generating a continuous wave (CW) radio frequency (RF) signal, B. a cable assembly that includes one or more non-graded cables, the cable assembly having a first end and a second end;

C. a transmitter connected to the first end of the cable assembly for transmitting the CW RF signal, D. a receiver connected to the second end of the cable assembly for receiving and detecting the phase of the transmitted CW RF signal, E. means for comparing the phase of the received CW RF signal to the phase of a reference CW RF signal to produce a comparison signal, and F. an alarm circuit for generating an alarm when the phase of the received signal differs from the phase of reference signal by more than a predetermined amount;

wherein said intrusion detection system further comprises:

a. a filter for filtering the comparison signal to remove slowly varying changes occurring in the comparison signal due to background environmental effects, b. a circuit for calculating a response signal monotonically related to the magnitude of the comparison signal, and c. the alarm circuit generates the alarm when the response signal exceeds a predetermined threshold.

11. The system of claim 10, wherein the cable assembly is comprised of a transmit cable and a receive cable of essentially equal length and disposed at a constant distance from each other, and wherein:

said transmit cable has a first end, a second end and a characteristic impedance, said first end of the transmit cable connected to the transmitter, said receive cable has a first end, a second end and a characteristic impedance, said second end of the receive cable connected to the receiver, and further wherein:

said first end of the transmit cable is aligned with said first end of the receive cable to correspond to said first end of the cable assembly, and said second end of the transmit cable is aligned with said second end of the receive cable to correspond to said second end of the cable assembly.

12. The system of claim 11 further including a means for comparing the magnitude of the received CWRF signal to the magnitude of a reference CWRF signal; and the alarm circuit generating an alarm when the magnitude of the received signal differs from the magnitude of the reference signal by more than a predetermined amount.

13. The system of claim 11 wherein:

a. said second end of the transmit cable terminated in the characteristic impedance of the transmit cable, and b. said first end of the receive cable terminated in the characteristic impedance of the receive cable.

14. The system of claim 11, wherein the transmit and receive cables are unshielded balanced cables.

15. The system of claim 11, wherein the transmit and receive cables are slotted coaxial cables.

16. The system of claim 10, wherein the cable assembly is comprised of a single detection cable having a first end corresponding to said first end of the cable assembly and connected to said transmitter, and a second end corresponding to said second end of the cable assembly and connected to said receiver.

17. The system of claim 16, wherein the detection cable is a balanced cable.

18. The system of claim 16, wherein the detection cable is a slotted coaxial cable.

19. A system for detecting the intrusion of objects into a region adjacent to a railroad track, the system including:

A. a local oscillator for generating a continuous wave (CW) radio frequency (RF) signal, B. a cable assembly having a first end and a second end, the cable assembly being situated adjacent to a length of the railroad track;

C. a transmitter connected to the first end of the cable assembly for transmitting the CW RF signal, D. a receiver connected to the second end of the cable assembly for receiving and detecting the phase of the transmitted CW RF signal, E. means for comparing the phase of the received CW RF signal to the phase of a reference CW RF signal to produce a comparison signal, and F. an alarm circuit for generating an intrusion alarm when the phase of the received signal differs from the phase of the reference signal by more than a predetermined amount;

wherein said system further comprises:

a. a filter for filtering the comparison signal to remove slowly varying changes occurring in the comparison signal due to background environmental effects, b. a circuit for calculating a response signal monotonically related to the magnitude of the comparison signal, and c. the alarm circuit generates the alarm when the response signal exceeds a predetermined threshold.

20. The system of claim 19, wherein the cable assembly is comprised of a transmit cable and a receive cable of essentially equal length and disposed at a constant distance from each other, and wherein:

said transmit cable has a first end, a second end and a characteristic impedance that produces, when the CW RF signal is present on the cable, an associated electromagnetic force that attenuates along the length of the cable based on the distance from the first end of the cable, said first end of the transmit cable being connected to the transmitter, said receive cable has a first end, a second end and a characteristic impedance that produces, when the CW RF signal is present on the cable, an associated electromagnetic force that attenuates along the length of the cable based on the distance from the second end of the cable, said second end of the receive cable being connected to the receiver, and further wherein:

said first end of the transmit cable being further aligned with said first end of the receive cable to correspond to said first end of the cable assembly, and said second end of the transmit cable being aligned with said second end of the receive cable to correspond to said second end of the cable assembly.

21. The system of claim 20 further including a means for comparing the magnitude of the received CW RF signal to the magnitude of a reference CW RF signal; and the alarm circuit generating an alarm when the magnitude of the received signal differs from the magnitude of the reference signal by more than a predetermined amount.

22. The system of claim 20 wherein:

a. said second end of the transmit cable is terminated in the characteristic impedance of the transmit cable, and b. said first end of the receive cable is terminated in the characteristic impedance of the receive cable.

23. The system of claim 20, wherein the transmit and receive cables are unshielded balanced cables.

24. The system of claim 20, wherein the transmit and receive cables are slotted coaxial cables.

25. The system of claim 19, wherein the cable assembly is comprised of a single detection cable having a first end corresponding to said first end of the cable assembly and connected to said transmitter, and a second end corresponding to said second end of the cable assembly and connected to said receiver, wherein an intrusion into the region adjacent to the railroad track results in a change in a dielectric constant associated with the cable and produces in the received CW RF signal an associated change in the phase, magnitude or both.

26. The system of claim 25, wherein the detection cable is a balanced cable.

27. The system of claim 25, wherein the detection cable is a slotted coaxial cable.

* * * * *